United States Patent
Okabayashi

(10) Patent No.: US 11,355,212 B2
(45) Date of Patent: Jun. 7, 2022

(54) CALCULATION PROCESSING APPARATUS, AND METHOD FOR CONTROLLING CALCULATION PROCESSING APPARATUS

(71) Applicant: FUJITSU LIMITED, Kawasaki (JP)

(72) Inventor: Toru Okabayashi, Akishima (JP)

(73) Assignee: FUJITSU LIMITED, Kawasaki (JP)

( * ) Notice: Subject to any disclaimer, the term of this patent is extended or adjusted under 35 U.S.C. 154(b) by 428 days.

(21) Appl. No.: 16/697,871

(22) Filed: Nov. 27, 2019

(65) Prior Publication Data
US 2020/0185050 A1   Jun. 11, 2020

(30) Foreign Application Priority Data
Dec. 6, 2018   (JP) .............................. JP2018-229044

(51) Int. Cl.
| G11C 29/38 | (2006.01) |
| G11C 29/18 | (2006.01) |
| G06F 11/34 | (2006.01) |
| G06F 21/78 | (2013.01) |
| G06F 9/445 | (2018.01) |

(52) U.S. Cl.
CPC .......... *G11C 29/18* (2013.01); *G06F 9/44589* (2013.01); *G06F 11/3471* (2013.01); *G06F 21/78* (2013.01); *G11C 29/38* (2013.01); *G06F 2201/88* (2013.01)

(58) Field of Classification Search
CPC ..... G11C 29/18; G11C 29/38; G06F 9/44589; G06F 11/3471; G06F 21/78; G06F 2201/88; G06F 11/364; G06F 11/3648

USPC ......................................................... 711/128
See application file for complete search history.

(56) References Cited

U.S. PATENT DOCUMENTS

| 9,959,191 B2* | 5/2018 | Lee ..................... G06F 11/3466 |
| 2003/0115417 A1* | 6/2003 | Corrigan ............. G06F 11/1068 |
| | | 714/E11.038 |
| 2008/0177756 A1* | 7/2008 | Kosche ............... G06F 11/3476 |
| 2010/0077143 A1 | 3/2010 | Reid et al. |
| 2021/0349826 A1* | 11/2021 | Roy .................... G06F 13/1668 |

FOREIGN PATENT DOCUMENTS

| JP | 2008-305306 A | 12/2008 |
| JP | 2010-020767 A | 1/2010 |

* cited by examiner

*Primary Examiner* — Huan Hoang
*Assistant Examiner* — Minh Dinh
(74) *Attorney, Agent, or Firm* — Fujitsu Patent Center

(57) ABSTRACT

An offset address generator generates a plurality of offset addresses at an interval of a basic processing unit size on the basis of an access destination address from a calculating circuit, partitions an access destination memory region from the calculating circuit to set a plurality of verification address ranges. A determiner sequentially determines whether the plurality of set verification address ranges are matched with a monitoring target address. With this configuration, it is possible to simplify the configuration of a debug function in a processor.

8 Claims, 15 Drawing Sheets

FIG.2

STRIDE WIDTH = 0

| DIVISION PROCESS FLOW NUMBER | OFFSET ADDRESS CALCULATION VALUE |
|---|---|
| 0 | BASE ADDRESS + 0x0 |
| 1 | BASE ADDRESS + 0x8 |
| 2 | BASE ADDRESS + 0x10 |
| 3 | BASE ADDRESS + 0x18 |
| ... | ... |

FIG.3

STRIDE WIDTH = 2
DATA SIZE UNIT 8B

| DIVISION PROCESS FLOW NUMBER | OFFSET ADDRESS CALCULATION VALUE |
|---|---|
| 0 | BASE ADDRESS + 0x0 |
| 1 | BASE ADDRESS + 0x10 |
| 2 | BASE ADDRESS + 0x20 |
| 3 | BASE ADDRESS + 0x30 |
| ... | ... |

FIG.4

STRIDE WIDTH = 2
DATA SIZE UNIT 1B/2B/4B

| DIVISION PROCESS FLOW NUMBER | OFFSET ADDRESS CALCULATION VALUE |
|---|---|
| 0 | BASE ADDRESS + 0x0 |
| 1 | BASE ADDRESS + 0x8 |
| 2 | BASE ADDRESS + 0x10 |
| 3 | BASE ADDRESS + 0x18 |
| ... | ... |

FIG.5

STRIDE WIDTH = 3
DATA SIZE UNIT 8B

| DIVISION PROCESS FLOW NUMBER | OFFSET ADDRESS CALCULATION VALUE |
|---|---|
| 0 | BASE ADDRESS + 0x0 |
| 1 | BASE ADDRESS + 0x18 |
| 2 | BASE ADDRESS + 0x30 |
| 3 | BASE ADDRESS + 0x48 |
| ... | ... |

FIG.6

STRIDE WIDTH = 3
DATA SIZE UNIT 1B/2B/4B

| DIVISION PROCESS FLOW NUMBER | OFFSET ADDRESS CALCULATION VALUE |
|---|---|
| 0 | BASE ADDRESS + 0x0 |
| 1 | BASE ADDRESS + 0xC |
| 2 | BASE ADDRESS + 0x18 |
| 3 | BASE ADDRESS + 0x24 |
| ... | ... |

FIG.7

| STRIDE WIDTH = 0 | HEAD + 0x9 PT9 | HEAD + 0x8 PT8 | HEAD + 0x7 PT7 | HEAD + 0x6 PT6 | HEAD + 0x5 PT5 | HEAD + 0x4 PT4 | HEAD + 0x3 PT3 | HEAD + 0x2 PT2 | HEAD + 0x1 PT1 | HEAD + 0x0 PT0 |
|---|---|---|---|---|---|---|---|---|---|---|
| B0 |  |  |  |  |  |  |  |  |  | 1B/2B/4B/8B |
| B1 |  |  |  |  |  |  |  |  | 2B/4B/8B |  |
| B2 |  |  |  |  |  |  |  | 4B/8B |  |  |
| B3 |  |  |  |  |  |  | 4B/8B |  |  |  |
| B4 |  |  |  |  |  | 8B |  |  |  |  |
| B5 |  |  |  |  | 8B |  |  |  |  |  |
| B6 |  |  |  | 8B |  |  |  |  |  |  |
| B7 |  |  | 8B |  |  |  |  |  |  |  |

BYTE EFFECTIVE BIT (REGISTER IMAGE)

FIG.8

STRIDE WIDTH = 2

| BYTE EFFECTIVE BIT (REGISTER IMAGE) | PT0 HEAD + 0x0 | PT1 HEAD + 0x1 | PT2 HEAD + 0x2 | PT3 HEAD + 0x3 | PT4 HEAD + 0x4 | PT5 HEAD + 0x5 | PT6 HEAD + 0x6 | PT7 HEAD + 0x7 | PT8 HEAD + 0x8 | PT9 HEAD + 0x9 |
|---|---|---|---|---|---|---|---|---|---|---|
| B0 | 1B/2B/4B/8B | | | | | | | | | |
| B1 | | 2B/4B/8B | | | | | | | | |
| B2 | | | 1B | | | | | | | |
| B3 | | | 4B/8B | 4B/8B | | | | | | |
| B4 | | | | | 1B/2B | | | | | |
| B5 | | | | | | 2B | | | | |
| B6 | | | | | | | 1B | | | |
| B7 | | | | | 8B | 8B | 8B | 8B | | |

FIG.9

| | PT9 HEAD + 0x9 | PT8 HEAD + 0x8 | PT7 HEAD + 0x7 | PT6 HEAD + 0x6 | PT5 HEAD + 0x5 | PT4 HEAD + 0x4 | PT3 HEAD + 0x3 | PT2 HEAD + 0x2 | PT1 HEAD + 0x1 | PT0 HEAD + 0x0 |
|---|---|---|---|---|---|---|---|---|---|---|
| B0 | | | | | | | | | | 1B/2B/4B/8B |
| B1 | | | | | | | | | 2B/4B/8B | |
| B2 | | | 2B | 1B/2B | | | | 4B/8B | | |
| B3 | 1B | | | | | | 1B | 4B/8B | | |
| B4 | | | | | | 8B | | | | |
| B5 | | | | | 8B | | | | | |
| B6 | | | | 8B | | | | | | |
| B7 | | | 8B | | | | | | | |

STRIDE WIDTH = 3

BYTE EFFECTIVE BIT (REGISTER IMAGE)

FIG.10

| HEAD + 0x2 | HEAD + 0x1 | HEAD + 0x0 |
|---|---|---|
| PT2 | PT1 | PT0 |
| OS ADDRESS[3] == WP ADDRESS[3] & (<br>OS ADDRESS[2:0] = 000 & BYTE MASK[2]\|<br>OS ADDRESS[2:0] = 001 & BYTE MASK[3]\|<br>OS ADDRESS[2:0] = 010 & BYTE MASK[4]\|<br>OS ADDRESS[2:0] = 011 & BYTE MASK[5]\|<br>OS ADDRESS[2:0] = 100 & BYTE MASK[6]\|<br>OS ADDRESS[2:0] = 101 & BYTE MASK[7])\|<br>OS ADDRESS[3] + 1 == WP ADDRESS[3] &<br>(OS ADDRESS[2:0] = 110 & BYTE MASK[0]\|<br>OS ADDRESS[2:0] = 111 & BYTE MASK[1]) | OS ADDRESS[3] == WP ADDRESS[3] & (<br>OS ADDRESS[2:0] = 000 & BYTE MASK[1]\|<br>OS ADDRESS[2:0] = 001 & BYTE MASK[2]\|<br>OS ADDRESS[2:0] = 010 & BYTE MASK[3]\|<br>OS ADDRESS[2:0] = 011 & BYTE MASK[4]\|<br>OS ADDRESS[2:0] = 100 & BYTE MASK[5]\|<br>OS ADDRESS[2:0] = 101 & BYTE MASK[6]\|<br>OS ADDRESS[2:0] = 110 & BYTE MASK[7])\|<br>OS ADDRESS[3] + 1 == WP ADDRESS[3] &<br>OS ADDRESS[2:0] = 111 & BYTE MASK[0] | OS ADDRESS[3] == WP ADDRESS[3] & (<br>OS ADDRESS[2:0] = 000 & BYTE MASK[0]\|<br>OS ADDRESS[2:0] = 001 & BYTE MASK[1]\|<br>OS ADDRESS[2:0] = 010 & BYTE MASK[2]\|<br>OS ADDRESS[2:0] = 011 & BYTE MASK[3]\|<br>OS ADDRESS[2:0] = 100 & BYTE MASK[4]\|<br>OS ADDRESS[2:0] = 101 & BYTE MASK[5]\|<br>OS ADDRESS[2:0] = 110 & BYTE MASK[6]\|<br>OS ADDRESS[2:0] = 111 & BYTE MASK[7]) |

| HEAD + 0x9 | HEAD + 0x8 |
|---|---|
| PT9 | PT8 |
| OS ADDRESS[3] + 1 == WP ADDRESS[3] & (<br>OS ADDRESS[2:0] = 000 & BYTE MASK[1]\|<br>OS ADDRESS[2:0] = 001 & BYTE MASK[2]\|<br>OS ADDRESS[2:0] = 010 & BYTE MASK[3]\|<br>OS ADDRESS[2:0] = 011 & BYTE MASK[4]\|<br>OS ADDRESS[2:0] = 100 & BYTE MASK[5]\|<br>OS ADDRESS[2:0] = 101 & BYTE MASK[6]\|<br>OS ADDRESS[2:0] = 110 & BYTE MASK[7])\|<br>OS ADDRESS[3] == WP ADDRESS[3] &<br>OS ADDRESS[2:0] = 111 & BYTE MASK[0] | OS ADDRESS[3] + 1 == WP ADDRESS[3] & (<br>OS ADDRESS[2:0] = 000 & BYTE MASK[0]\|<br>OS ADDRESS[2:0] = 001 & BYTE MASK[1]\|<br>OS ADDRESS[2:0] = 010 & BYTE MASK[2]\|<br>OS ADDRESS[2:0] = 011 & BYTE MASK[3]\|<br>OS ADDRESS[2:0] = 100 & BYTE MASK[4]\|<br>OS ADDRESS[2:0] = 101 & BYTE MASK[5]\|<br>OS ADDRESS[2:0] = 110 & BYTE MASK[6]\|<br>OS ADDRESS[2:0] = 111 & BYTE MASK[7]) |

FIG.11

OFFSET ADDRESS = 0xfff9
STRIDE WIDTH = 0
DATA SIZE = 4B
WATCH POINT ADDRESS = 0xfff8
BYTE MASK[7:0] = 00000100

LOWER BYTE ACCESS POSITION INFORMATION

| PT9 | PT8 | PT7 | PT6 | PT5 | PT4 | PT3 | PT2 | PT1 | PT0 |
|-----|-----|-----|-----|-----|-----|-----|-----|-----|-----|
| 0   | 0   | 0   | 0   | 0   | 0   | 0   | 0   | 1   | 0   |

BYTE VALID BIT POSITION

|    | PT9 | PT8 | PT7 | PT6 | PT5 | PT4 | PT3 | PT2 | PT1 | PT0 |
|----|-----|-----|-----|-----|-----|-----|-----|-----|-----|-----|
| B0 | 0   | 0   | 0   | 0   | 0   | 0   | 0   | 0   | 0   | 1   |
| B1 | 0   | 0   | 0   | 0   | 0   | 0   | 0   | 0   | 1   | 0   |
| B2 | 0   | 0   | 0   | 0   | 0   | 0   | 0   | 1   | 0   | 0   |
| B3 | 0   | 0   | 0   | 0   | 0   | 0   | 1   | 0   | 0   | 0   |
| B4 | 0   | 0   | 0   | 0   | 0   | 0   | 0   | 0   | 0   | 0   |
| B5 | 0   | 0   | 0   | 0   | 0   | 0   | 0   | 0   | 0   | 0   |
| B6 | 0   | 0   | 0   | 0   | 0   | 0   | 0   | 0   | 0   | 0   |
| B7 | 0   | 0   | 0   | 0   | 0   | 0   | 0   | 0   | 0   | 0   |

CALCULATION PROCESSING APPARATUS, AND METHOD FOR CONTROLLING CALCULATION PROCESSING APPARATUS

CROSS-REFERENCE TO RELATED APPLICATION

This application is based upon and claims the benefit of priority of the prior Japanese Patent application No. 2018-229044, filed on Dec. 6, 2018, the entire contents of which are incorporated herein by reference.

FIELD

The embodiments discussed herein are related to a calculation processing apparatus and a method for controlling the calculation processing apparatus.

BACKGROUND

A technique using a watch point is known as a debug function which is installed in a processor as a calculation processing apparatus. In the debug function using the watch point, a specific address of a memory is set as a monitoring target address (watch point). In a case where data access to the monitoring target address is detected, a trouble routine is performed to stop the process in progress.

FIG. 15 is a diagram for describing the debug function of a processor of the related art.

A processor 500 illustrated in FIG. 15 includes a processor core 501, a watch point register 503, an upper byte address match circuit 502, a lower byte address match circuit 505, a lower byte element address generation circuit 504, and a detection notification determination circuit 506.

The processor core 501 notifies information (hereinafter, simply referred to as data size information) which indicates a command to be executed and a data size of a memory access region which is generated by the execution of the command to the lower byte element address generation circuit 504 and the lower byte address match circuit 505.

In addition, the processor core 501 notifies an address (hereinafter, this may be simply referred to as access destination address) of the access destination of the memory access generated by the execution of the command to the upper byte address match circuit 502 and the lower byte element address generation circuit 504.

The watch point register 503 stores an address (hereinafter, this may be referred to as watch point address) of the watch point which is set by a user. In the watch point register 503, for example, a predetermined size (for example, 8 bytes) of the watch point address is set. In addition, the watch point register 503 stores a byte mask and a detection permission bit.

The watch point address read out of the watch point register 503 is input to the upper byte address match circuit 502 and the lower byte address match circuit 505.

The detection permission bit is information indicating whether the detection of the watch point address is permitted, and is set by a user in advance. For example, in a case where the detection of the watch point address is performed, the detection permission bit is set to "1". The detection permission bit read out of the watch point register 503 is input to an AND gate 5061 of the detection notification determination circuit 506.

The byte mask is a mask for extracting a portion (bit) to be compared with the watch point address in a bit string of the address of a processing target. The byte mask read out of the watch point register 503 is input to the lower byte address match circuit 505.

The upper byte address match circuit 502 compares the upper byte of the access destination address notified from the processor core 501 and the upper byte of the watch point address notified from the watch point register 503. In a case where the address of the upper byte is matched as a result of comparison, the upper byte address match circuit 502 outputs "1 (High)" to the AND gate 5061 of the detection notification determination circuit 506.

The lower byte element address generation circuit 504 divides the data bus width to be accessed with one command by a predetermined processing unit size to generate a plurality of element addresses on the basis of the access destination address, the command, and the data size information. The processing unit size is a data size (data length) once read by the processor core 501 and is, for example, 4 B (byte).

The lower byte element address generation circuit 504 is prepared as many as the number of element addresses which are generated by dividing from the data bus width. For example, in a case where the data bus width of the lower byte is 12 B, and the processing unit size is 4 B, three lower byte element address generation circuits 504 are provided. The addresses output from the processor core 501 are distributed and input to the plurality of lower byte element address generation circuits 504.

The lower byte element address generation circuit 504 inputs each generated element address to the lower byte address match circuit 505.

The lower byte address match circuit 505 compares the element address input from the lower byte element address generation circuit 504 with the lower byte of the watch point address read out of the watch point register 503. At this time, the lower byte address match circuit 505 performs comparison on a bit which is not masked by the byte mask read out of the watch point register 503.

The lower byte address match circuit 505 is provided as many as the number of lower byte element address generation circuits 504. In the example illustrated in FIG. 15, the lower byte address match circuit 505 and the lower byte element address generation circuit 504 are provided by three respectively. In other words, the lower byte address match circuit 505 is provided in correspondence with the lower byte element address generation circuit 504.

The lower byte element address generation circuit 504 is connected to each lower byte address match circuit 505. The element address generated in one lower byte element address generation circuit 504 is input to the corresponding lower byte address match circuit 505.

In a case where the element address matches the watch point address in a portion which is not masked by the byte mask as a result of comparison, the lower byte address match circuit 505 outputs "1 (High)" to the detection notification determination circuit 506.

The detection notification determination circuit 506 includes the AND gate 5061 and an OR gate 5062. The AND gate 5061 is provided as many as the number of lower byte address match circuits 505. In other words, the AND gate 5061 is provided in correspondence with the lower byte address match circuit 505.

The AND gate 5061 is connected to one lower byte address match circuit 505. The output (comparison result) of one lower byte address match circuit 505 is input to the corresponding AND gate 5061.

In addition, each AND gate 5061 receives the output (comparison result) of the upper byte address match circuit 502, and the detection permission bit read out of the watch point register 503.

In a case where the output value of the lower byte address match circuit 505, the output value of the upper byte address match circuit 502, and the detection permission bit from the watch point register 503 all are "1", each AND gate 5061 outputs "1". The output of each AND gate 5061 is input to the OR gate 5062. If "1" is input from any AND gate 5061, the OR gate 5062 outputs (notifies) the detection notification "1" to the processor core 501.

With such a configuration, in the debug function of the processor 500 of the related art, a plurality of element addresses obtained by the lower byte element address generation circuit 504 which divides the data bus width by the processing unit size on the basis of the access destination address, the command, and the data size information from the processor core 501.

Then, the upper byte address match circuit 502 compares the upper byte of the access destination address with the upper byte of the watch point address. In addition, the lower byte address match circuit 505 performs the comparison using address information of all the elements, the command, the data size information, the watch point address read out of the watch point register 503, and the byte mask.

If a byte matching the watch point address is detected with respect to the address information of any element address on the basis of these comparison results, the detection notification determination circuit 506 performs the detection notification on the processor core 501.

[Patent Literature 1] Japanese Laid-open Patent Publication No. 2010-20767 A
[Patent Literature 2] Japanese Laid-open Patent Publication No. 2008-305306 A In recent years, a command set architecture (Industrial Standard Architecture: ISA) is expanded in order to improve a processing performance of the processor, and the types of command and the data bus width are increased.

If the stride command is expanded or the data bus width is increased, the lower byte element address generation circuit 504, the upper byte address match circuit 502, and the AND gate 5061 are increased in the processor 500. With this configuration, the lines and wirings mounted in the processor 500 are increased, a circuit area is increased, and the mounting onto the device is difficult.

SUMMARY

According to an aspect of the embodiments, a calculation processing apparatus includes a calculating circuit, and a monitoring circuit which monitors data access from the calculating circuit to a monitoring target address. The monitoring circuit includes an offset address generator configured to generate a plurality of offset addresses at a pitch of a basic processing unit size on the basis of an access destination address from the calculating circuit, and configured to set a plurality of verification address ranges by partitioning an access destination memory region to be accessed from the calculating circuit, and a determiner configured to determine sequentially whether the plurality of generated verification address ranges are matched with the monitoring target address.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating a lower byte offset address in the processor as an example of the embodiment;

FIG. 3 is a diagram illustrating the lower byte offset address in the processor as an example of the embodiment;

FIG. 4 is a diagram illustrating the lower byte offset address in the processor as an example of the embodiment;

FIG. 5 is a diagram illustrating the lower byte offset address in the processor as an example of the embodiment;

FIG. 6 is a diagram illustrating the lower byte offset address in the processor as an example of the embodiment;

FIG. 7 is a diagram for describing lower byte valid bit position information in the processor as an example of the embodiment;

FIG. 8 is a diagram for describing the lower byte valid bit position information in the processor as an example of the embodiment;

FIG. 9 is a diagram for describing the lower byte valid bit position information in the processor as an example of the embodiment;

FIG. 10 is a diagram for describing a method for generating byte access position information using a lower byte access position generation circuit of the processor as an example of the embodiment;

FIG. 11 is a diagram for describing a method for generating the byte access position information in the processor as an example of the embodiment;

DESCRIPTION OF EMBODIMENT(S)

Figure 1:
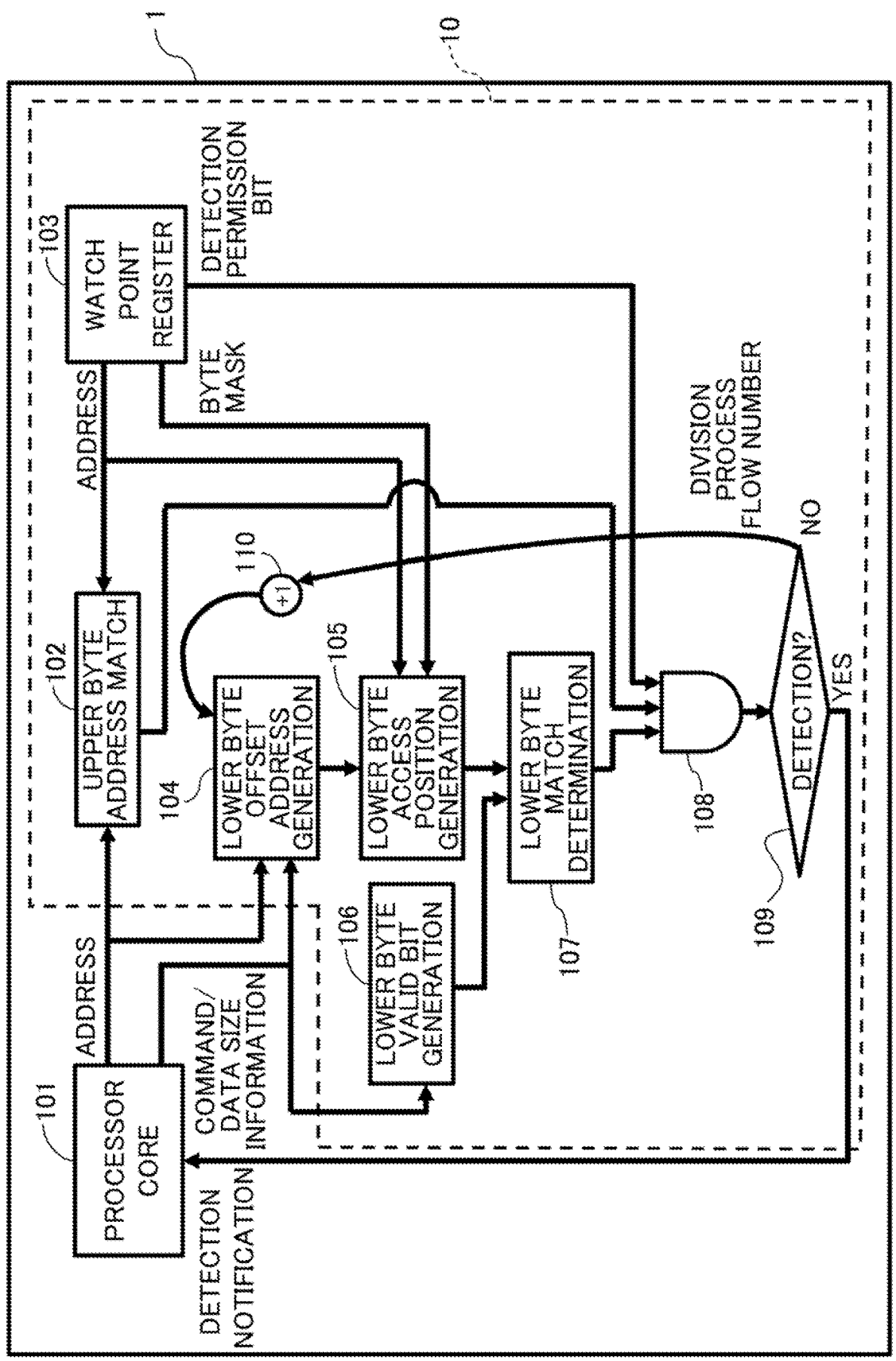
FIG. 1 is a diagram for describing a configuration of a debug circuit of a processor as an example of an embodiment.

Hereinafter, embodiments of a calculation processing apparatus and a method for controlling the calculation processing apparatus will be described with reference to the drawings. However, the embodiments described below are merely given as examples, and there is no intention to exclude various modifications and applications of the techniques which are not illustrated in the embodiments. In other words, various modifications of the embodiments may be made within a scope not departing from the spirit. In addition, the drawings include not only the components illustrated in the drawings, but may include other functions.

(A) Configurations

FIG. 1 is a diagram for describing a configuration of a debug circuit 10 of the processor 1 as an example of an embodiment.

The processor 1 illustrated in FIG. 1 includes a processor core 101, and performs various calculation processes. In addition, the processor 1 includes the debug circuit 10 which performs a program debugging.

The debug circuit 10 realizes a function of detecting data access from the processor core 101 to a specific memory address (watch point), and of notifying to the processor core 101. The debug circuit 10 verifies whether a watch point address is included in a memory region (access destination memory region; verification address range) of the access destination from the processor core 101.

If the detection of the memory access from the debug circuit 10 to the watch point is notified, the processor core 101 performs, for example, a process of suspending the execution of the program.

The debug circuit 10 includes, as illustrated in FIG. 1, a watch point register 103, an upper byte address match circuit 102, a lower byte offset address generation circuit 104, a lower byte access position generation circuit 105, a lower byte valid bit generation circuit 106, a lower byte match determination circuit 107, an AND gate 108, a determination circuit 109, and an increment circuit 110.

The processor core 101 notifies information (hereinafter, simply referred to as data size information) indicating a command to be executed and a data size of a memory access region generated by executing the command to the lower byte offset address generation circuit 104 and the lower byte valid bit generation circuit 106.

In addition, the processor core 101 notifies an address (hereinafter, this may be referred to as access destination address) of the access destination of the memory access generated by the execution of the command to the upper byte address match circuit 102 and the lower byte offset address generation circuit 104. In addition, the access destination address may be referred to as a verification address or a verification address range.

The watch point register 103 stores an address (monitoring target address; hereinafter, this may be referred to as watch point address) of the watch point which is set by a user. The watch point address is a memory address (monitoring target address) as a target for detecting data access of a program which is executed by the processor core 101. The watch point indicates, for example, a position (address) where the execution of a program is suspended.

The debug circuit 10 determines whether the verification address matches the watch point address.

The watch point address read out of the watch point register 103 is input to the upper byte address match circuit 102 and the lower byte access position generation circuit 105.

In addition, the watch point register 103 stores a byte mask and a detection permission bit.

The detection permission bit is information indicating whether the detection of the watch point address is permitted, and is set by a user in advance. For example, in a case where the detection of the watch point address is performed, the detection permission bit is set to "1". The detection permission bit read out of the watch point register 103 is input to the AND gate 108.

The byte mask is a mask for extracting a portion (position; bit) to be compared with the watch point address in a data string (bit string) which forms a memory address of an access target (processing target) from the processor core 101. In other words, the byte mask is information for extracting a verification bit position in the bit string which forms an offset address.

The byte mask read out of the watch point register 103 is input to the lower byte access position generation circuit 105.

The byte mask is, for example, a bit string of 8 bits [7:0], and has a processing unit size (8 bytes).

The watch point register 103 serves as a memory which stores the watch point address and the byte mask.

The upper byte address match circuit 102 compares the upper byte in the access destination address notified from the processor core 101 and the upper byte of the watch point address notified from the watch point register 103 (upper byte address match determination).

The upper byte may be a portion other than the byte of the lower portion (lower byte) in a data address as the access destination of the processor core 101, on which the lower byte match determination circuit 107 (described below) performs determination.

In a case where the address of the upper byte matches the upper byte of the watch point address as a result of the comparison of the upper byte address match circuit 102, the upper byte address match circuit 102 outputs "1" (High) indicating "match" as a determination result to the AND gate 108. Hereinafter, the output of the determination result of the upper byte address match circuit 102 may be referred to as an upper byte address match signal.

On the other hand, in a case where the address of the upper byte doesn't match the upper byte of the watch point address as a result of the comparison of the upper byte address match circuit 102, the upper byte address match circuit 102 outputs "0" (Low) indicating "mismatch" as a determination result to the AND gate 108.

The lower byte offset address generation circuit 104 generates (sets) a head address (lower byte offset address) of a watch point search target (verification address range) on the basis of the lower byte of the access destination address. The lower byte offset address generation circuit 104 generates the lower byte offset address on the basis of the type of command and the data size information input from the processor core 101.

The lower byte offset address generation circuit 104 defines the lower byte of access destination address as a base address, and adds a value (adding value) corresponding to a predetermined data width (for example, 8 bytes) to the base address so as to generate the lower byte offset address.

The lower byte offset address generation circuit 104 repeatedly adds a basic processing unit size to the calculated lower byte offset address so as to generate a plurality of lower byte offset addresses (offset address calculation value).

The lower byte offset address generation circuit 104 generates the plurality of lower byte offset addresses (offset address) at an interval of the basic processing unit size on the basis of the access destination address notified from the processor core 101.

With plurality of lower byte offset addresses, the access destination memory region from the processor core 101 is virtually divided (partitioned) into a plurality of regions of the basic processing unit size.

Therefore, the lower byte offset address generation circuit 104 generates (calculates) the plurality of lower byte offset addresses to virtually divide the access destination region (data bus width) of the processor core 101 for each predetermined data width (processing unit size; for example, 8 bytes).

Each region virtually divided by the plurality of lower byte offset addresses generated by the lower byte offset address generation circuit 104 may be referred to as a division process flow (verification address range).

In this way, the lower byte offset address generation circuit 104 generates (calculates) the plurality of lower byte offset addresses, and sets a plurality of division process flows by partitioning the access destination memory region from the processor core 101.

A division process flow number is identification information to specify each generated division process flow, and is set by the increment circuit 110 described below. The division process flow number is set to the division process flow in an order from the head of the access destination memory region as a serial number. In other words, the plurality of division process flows generated by the lower byte offset address generation circuit 104 are ordered by the division process flow number.

With this configuration, the division process flows (verification address ranges) can be switched in order by designating and increasing the division process flow number.

The lower byte offset address generation circuit 104 virtually divides the data bus width at an equal interval to set the plurality of lower byte offset addresses. The plurality of generated lower byte offset addresses serves as a pointer or a boundary to partition the access destination memory region from the processor core 101 by the processing unit size. In addition, each lower byte offset address serves as a head address of each watch point search target (verification address range).

In addition, in a case where a stride width is set, the lower byte offset address generation circuit 104 reflects the stride width on an adding value. Further, the stride width can be obtained through a well-known technique on the basis of the data size information output from the processor core 101.

FIGS. 2 to 6 are diagrams illustrating the lower byte offset address in the processor 1 as an example of the embodiment.

FIG. 2 is a diagram illustrating a calculation example of the lower byte offset address in the case of stride width=0. FIG. 3 is a diagram illustrating a calculation example of the lower byte offset address in a case where the stride width=2 and the data size unit is 8 B (byte). FIG. 4 is a diagram illustrating a calculation example of the lower byte offset address in a case where stride width=2 and the data size unit is 1 B, 2 B, or 4 B.

FIG. 5 is a diagram illustrating a calculation example of the lower byte offset address in a case where stride width=3 and the data size unit is 8 B (byte). FIG. 6 is a diagram illustrating a calculation example of the lower byte offset address in a case where stride width=3 and the data size unit is 1 B, 2 B, or 4 B.

In the examples illustrated in FIGS. 2 to 6, a series of natural numbers is assigned to each generated lower byte offset address as the division process flow number in an order from the head.

In the processor 1, each verification address range having the generated lower byte offset address as the head is subjected to a match determination with respect to the watch point address.

The lower byte offset address generation circuit 104 sets the lower byte offset address from the commanded base address on the basis of the type of command and the data size information input from the processor core 101.

The lower byte offset address generation circuit 104 outputs the generated lower byte offset address to the lower byte access position generation circuit 105.

The lower byte valid bit generation circuit 106 generates lower byte valid bit position information with reference to the lower byte offset address on the basis of the command and the data size information output from the processor core 101.

The lower byte valid bit position information is information indicating whether the position is valid as an access destination from the processor core 101 and, for example, a position (lower byte valid bit position) from which data access can be made in an 8-byte data string of the lower byte offset address.

FIGS. 7 to 9 are diagrams for describing the lower byte valid bit position information in the processor 1 as an example of the embodiment.

FIGS. 7 to 9 illustrate a memory image viewed from the head (simply illustrated as the head in the drawing) of the offset address. FIG. 7 illustrates the lower byte valid bit position information in the case of stride width=0, and FIGS. 8 and 9 illustrate the case of stride width=2 and the case of stride width=3 respectively.

Further, hereinafter, the drawings in this embodiment are represented in a little endian format in which the head address is located on the right side. In other words, in FIGS. 7 to 9, the right side in the drawings becomes a side near the head (upper address), and the left side in the drawings becomes a side near the tail (lower address). Further, the data expression method is not limited to the little endian, may be a big endian format, or may be appropriately changed.

The lower byte valid bit position information illustrated in FIGS. 7 to 9 forms a matrix (table) associated with a plurality (10 in the example illustrated in FIG. 7) of continuous byte positions PT0 to PT9 with the lower byte offset address as a head with respect to byte valid bits B0 to B7 (8 bits) of a register image. In other words, the lower byte valid bit position information is configured as a 1-byte unit of table information.

Then, in the drawings, the capital characters 1 B, 2 B, 4 B, and 8 B represent the data size (unit: byte). The bit positions corresponding to the positions of 1 B, 2 B, 4 B, and 8 B represent the lower byte valid bit positions, and a valid bit 1 is set.

It is possible to determine whether data access is made in each position with the offset address as a head with reference to the lower byte valid bit position information illustrated in FIGS. 7 to 9.

Further, the lower byte valid bit position information is used commonly in a unit of division process, and thus not need to be generated for each division process flow.

In this example, the description is described about the example that the unit of division process flow is 8 bytes, but may represent 10 byte positions PT0 to PT9 in consideration of the stride width.

The lower byte access position generation circuit 105 generates byte access position information for each division process flow on the basis of the lower byte offset address, the watch point address, and the byte mask information.

The byte access position information indicates a position (byte access position) which becomes a comparison target with the watch point address of the lower byte match determination circuit 107 (described below) in the verification address.

The lower byte access position generation circuit 105 performs comparison with the byte mask at each bit position with the lower byte offset address as a head to determine whether the bit position is a byte access position, and generates the byte access position information.

Specifically, the lower byte access position generation circuit 105 applies a predefined conditional expression to each of the bit positions PT0 to PT9 with the lower byte offset address as a head to determine whether each bit position is a byte access position.

The byte access position information indicates whether each of the bit positions PT0 to PT9 is a byte access position. For example, "1" or "0" is set to each of the bit positions PT0 to PT9.

The lower byte access position generation circuit 105 set "1" to the bit positions PT0 to PT9 which are determined as a byte access position and sets "0" to the PT0 to PT9 other than the bit positions determined as a byte access position so as to generate the byte access position information.

FIG. 10 is a diagram for describing a method for generating the byte access position information using the lower byte access position generation circuit 105 of the processor 1 as an example of the embodiment.

FIG. 10 illustrates a memory image viewed from the head of the offset address, and a conditional expression for determining whether each of the plurality (10 in the example illustrated in FIG. 10) of continuous byte positions PT0 to PT9 with the lower byte offset address as a head is a position to be determined by the lower byte match determination circuit 107 (described below).

In this example, the description is described about the example that the unit of division process flow is 8 bytes, but may represent 10 byte positions PT0 to PT9 in consideration of the stride width.

In FIG. 10, the description will be mainly given about an example where the verification is performed at every 3rd bit of the offset address. However, the lower byte access position generation circuit 105 performs a similar process on each bit of the offset address.

In addition, in the drawing, the offset address may be expressed as an OS address, and the watch point address may be expressed as a WP address.

For example, the lower byte access position generation circuit 105 determines whether the byte position PT0 is an access byte position using Conditional Expression (1) below.

In other words, the lower byte access position generation circuit 105 sets information (flag: for example, 1) indicating valid to the byte position PT0 in a case where Conditional Expression (1) is satisfied. The byte position PT0 corresponds to the base address.

[Expression 1]

Offset Address[3]==Watch Point Address[3]&(Offset
  Address[2:0]=000 & byte mask[0]|Offset
  Address[2:0]=001 & Byte Mask[1]|Offset
  Address[2:0]=010 & Byte Mask[2]|Offset
  Address[2:0]=011 & Byte Mask[3]|Offset
  Address[2:0]=100 & Byte Mask[4]|Offset
  Address[2:0]=101 & Byte Mask[5]|Offset
  Address[2:0]=110 & Byte Mask[6]|Offset
  Address[2:0]=111 & Byte Mask[7])    (1)

In Conditional Expression (1), in a case where the condition "Offset Address[3]==Watch Point Address[3]" is satisfied, and any one of "Offset Address[2:0]=000 & Byte Mask[0]", "Offset Address[2:0]=001 & Byte Mask[1]", "Offset Address[2:0]=010 & Byte Mask[2]", "Offset Address[2:0]=011 & Byte Mask[3]", "Offset Address[2:0] =100 & Byte Mask[4]", "Offset Address[2:0]=101 & Byte Mask[5]", "Offset Address[2:0]=110 & Byte Mask[6]", and "Offset Address[2:0]=111 & Byte Mask[7]" is satisfied, information (flag; for example, 1) indicating valid is set to the corresponding position PT0.

Herein, "Offset Address[3]==Watch Point Address[3]" indicates that the value of the 3rd bit of the lower byte offset address matches the value of the 3rd bit of the watch point register.

In addition, for example, "Offset Address[2:0]=001 & Byte Mask[1]" indicates that the lower byte offset address of 3 bits is "001", and Byte Mask[1] is "1". In the base address, the position of Byte Mask[1] corresponds to Offset Address [2:0] a 001.

At the byte positions PT1 to PT9 subsequent to the byte position PT0, the byte mask is compared with the lower offset address shifted to a lower address direction (toward the tail) by the same number of bits as the distance from the byte position PT0 of the head.

For example, the lower byte access position generation circuit 105 determines whether the byte position PT1 is an access byte position using Conditional Expression (2) below.

In other words, the lower byte access position generation circuit 105 sets information (flag: for example, 1) indicating valid to the byte position PT1 in a case where Conditional Expression (2) is satisfied.

[Expression 2]

Offset Address[3]=Watch Point Address[3]&(Offset
  Address[2:0]=000 & Byte Mask[1]|Offset
  Address[2:0]−001 & Byte Mask[2]|Offset
  Address[2:0]=010 & Byte Mask[3]|Offset
  Address[2:0]−011 & Byte Mask[4]|Offset
  Address[2:0]=100 & Byte Mask[5]|Offset
  Address[2:0]=101 & Byte Mask[6]|Offset
  Address[2:0]=110 & Byte Mask[7])|Offset
  Address[3]+1==Watch Point Address[3]& Offset
  Address[2:0]=111 & Byte Mask[0]    (2)

Since the byte position PT1 becomes a position shifted 1 bit to the lower address direction (toward the tail) compared to the byte position PT0, the position in Conditional Expression (2) corresponds to a position of which the offset address corresponding to each byte mask is increased by 1 compared to Conditional Expression (I).

For example, the condition becomes such that "Offset Address[2:0]=001 & Byte Mask[2]" is satisfied, the lower byte offset address of 3 bits is "001", and Byte Mask[2] is "I".

In addition, the unit of division process flow is 8 bytes. Therefore, Byte Mask[0] is determined on whether Watch Point Address[3] matches "Offset Address[3+1]" which is next 8 bytes subsequent to "Offset Address 3]".

As illustrated in FIG. 10, the lower byte access position generation circuit 105 associates each of the byte positions PT0 to PT9 with the position of the byte mask set in the watch point register with respect to the lower byte offset address on the basis of the conditional expressions.

In this way, the byte mask is associated to the offset address which can take various values in each conditional expression.

With this configuration, the byte access position information can match the position of the byte mask set in the watch point register to the plurality of generated lower byte offset addresses by the lower byte valid bit generation circuit 106.

The lower byte access position generation circuit 105 associates the byte mask to each offset address using the byte access position information with respect to the byte positions PT0 to PT9 so as to determine (generate) a verification target position with respect to the watch point address in the offset address.

The lower byte access position generation circuit 105 sets "1" to the byte position which satisfying the above conditional expression among the byte positions PT0 to PT9, and sets "0" to the byte position which does not satisfy the conditional expression. The lower byte access position generation circuit 105 generates information "0" or "1" set to the byte positions PT0 to PT9 as the byte access position information.

FIG. 11 is a diagram for describing a method for generating the lower byte access position information and the lower byte valid bit position information in the processor 1 as an example of the embodiment.

In FIG. 11, an example of generating the lower byte access position information and the lower byte valid bit position information in the example of the offset address=0xfff9, the stride width=0, the data size=4 B, watch point address=0xfff8, and Byte Mask[7:01] 00000100.

In the example illustrated in FIG. 11, (PT9, PT8, PT7, PT6, PT5, PT4, PT3, PT2, PT1, PT0)=(0, 0, 0, 0, 0, 0, 1, 0) is generated from the conditional expression of FIG. 10 as the lower byte access position information, and a place where the valid bit becomes "1" by the table information of FIG. 7 is generated as the lower byte valid bit position information.

Further, the byte access position information is not limited to the example illustrated in FIG. 11, and may be appropriately changed according to a unit of division process and the number of bits of the byte mask.

The lower byte match determination circuit 107 compares the lower byte access position information of each division process generated by the lower byte access position generation circuit 105 with the lower byte valid bit position information generated by the lower byte valid bit generation circuit 106 (lower byte match determination). The lower byte match determination circuit 107 determines whether there is a position where the lower byte access position information and the lower byte valid bit position information are commonly set to "1".

The lower byte match determination circuit 107 retrieves the valid bit at the byte positions PT0 to PT9 of the lower byte valid bit position information in a place where the valid bit becomes "1" at the bit positions PT0 to PT9 of the byte access position information, and determines whether there is a place where the valid bit becomes "1".

If there is a place where the valid bit becomes "1", the lower byte match determination circuit 107 outputs the determination result "1" to the AND gate 108. For example, in a case where there is a position where the lower byte access position information and the lower byte valid bit position information are commonly set to "1", the lower byte match determination circuit 107 outputs the determination result "1" to the AND gate 108. On the other hand, in a case where there is no position where the lower byte access position information and the lower byte valid bit position information are commonly set to "1", the lower byte match determination circuit 107 outputs the determination result "0" to the AND gate 108.

Figure 12:
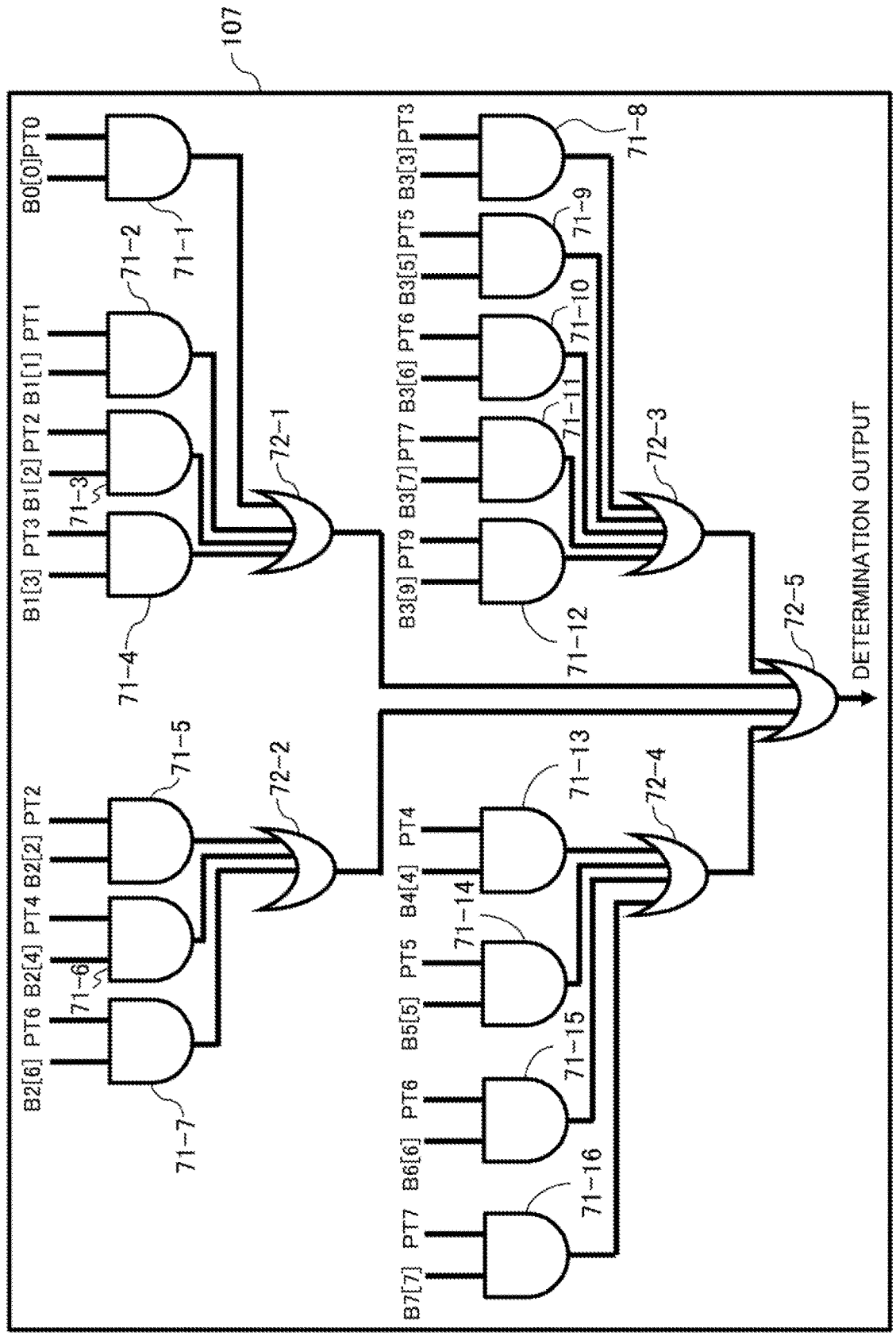
FIG. 12 is a diagram illustrating a configuration of a lower byte match determination circuit in the processor as an example of the embodiment.

FIG. 12 is a diagram illustrating a configuration of the lower byte match determination circuit 107 in the processor 1 as an example of the embodiment. In this example, the description is described about the example that the unit of division process flow is 8 bytes, but may represent 10 byte positions PT0 to PT9 in consideration of the stride width.

In the example illustrated in FIG. 12, PT0 to PT9 are the lower byte access position information generated by the lower byte access position generation circuit 105. B0 to B7 are the lower byte valid bit position information generated by the lower byte valid bit generation circuit 106.

Herein, the lower byte valid bit position information indicates all the places where the valid bits of FIGS. 7 to 9 become "1". B0 to B7 are noted using the numbers of the tail of PT0 to PT9 such that. If B0 is valid, only PT0 of which the valid bit becomes "1", so that the bit B0[0] is noted. If B1 is valid, PT1, PT2, and PT3 of which the valid bits become "1", so that the bits B1[1], B1[2], and B1[3] are noted.

The lower byte match determination circuit 107 illustrated in FIG. 12 includes a plurality (16 in the example illustrated in FIG. 12) of AND gates 71-1 to 71-16, and a plurality (5 in the example illustrated in FIG. 12) of OR gates 72-1 to 72-5.

Further, in the following description, if there is a need to specify one among the plurality of AND gates as a symbol indicating the AND gate of the lower byte match determination circuit 107, the symbols 71-1 to 71-16 are used, but if any one AND gate is designated, the symbol 71 is used. Similarly, in the following description, if there is a need to specify one among the plurality of OR gates as a symbol indicating the OR gate of the lower byte match determination circuit 107, the symbols 72-1 to 72-5 are used, but if any one OR gate is designated, the symbol 72 is used.

For example, the AND gate 71-4 receives the lower byte access position information PT3 and the output B1[3] corresponding to PT3 in the lower byte valid bit position information B1. In a case where two inputs are either "1", the AND gate 71-4 inputs "1" to the OR gate 72-1. Each AND gate 71 performs a similar process.

If any one of the AND gates 71-1 to 71-4 is input, the OR gate 72-1 inputs "1" to the OR gate 72-5. Each OR gate 72 performs a similar process.

If "1" is input from any one of the OR gate 72-1 to 72-4, the OR gate 72-5 outputs "1" to the AND gate 108.

The lower byte match determination circuit 107 determines the match with the watch point address using the plurality of division process flows generated by the lower byte offset address generation circuit 104 as one processing unit. Further, the lower byte match determination circuit is not limited to the example illustrated in FIG. 12, and may be appropriately changed according to a unit of division process and the stride width.

The AND gate 108 receives the detection permission bit read out of the watch point register 103, the determination result from the upper byte address match circuit 102, and the determination result from the lower byte match determination circuit 107.

The AND gate 108 outputs the result of a logical product of the three input signals. In other words, in a case where the detection permission bit read out of the watch point register 103, the determination result from the upper byte address match circuit 102, and the determination result from the lower byte match determination circuit 107 all are "1", "1" is output as a watch point detection.

In the AND gate 108, masking is performed using the detection permission bit read out of the watch point register 103. The output of the AND gate 108 is input to the determination circuit 109.

The determination circuit 109 determines whether the output signal from the AND gate 108 is "1". In a case where "1" is output from the AND gate 108 as a result of determination, the determination circuit 109 inputs "1" to the processor core 101 as a detection notification.

If the detection notification "1" is input from the debug circuit 10 (the determination circuit 109), the processor core 101 performs a predetermined process such as stopping the program in progress.

In addition, in a case where the detection notification "1" is not output from the AND gate 108, the determination circuit 109 issues a notification to the increment circuit 110 (increment command).

In the processor 1, it is determined the match with the watch point address using the plurality of division process flows generated by the lower byte offset address generation circuit 104 as one processing unit.

If the increment command is input from the determination circuit 109, the increment circuit 110 increases the division process flow number (+1), and notifies the increased division process flow number to the lower byte offset address generation circuit 104.

In other words, in a case where there is no place where the result of the lower byte match determination of the lower byte match determination circuit 107 becomes "1" but becomes "0", the increment circuit 110 increases the division process flow number (+1).

In the processor 1, in a case where the match to the watch point address is not detected in one division process flow, the match determination to the watch point address is performed on the division process flow specified by the next division process flow number.

The lower byte match determination circuit 107 calculates the byte access position information (see FIGS. 2 to 6) corresponding to a new division process flow number. Hereinafter, the processes of the lower byte offset address generation circuit 104, the lower byte access position generation circuit 105, and the lower byte match determination circuit 107 are repeatedly performed until the determination result "1" is detected in the determination circuit 109. In other words, the processes are repeatedly performed until the watch point is detected.

(B) Operations

Figure 13:
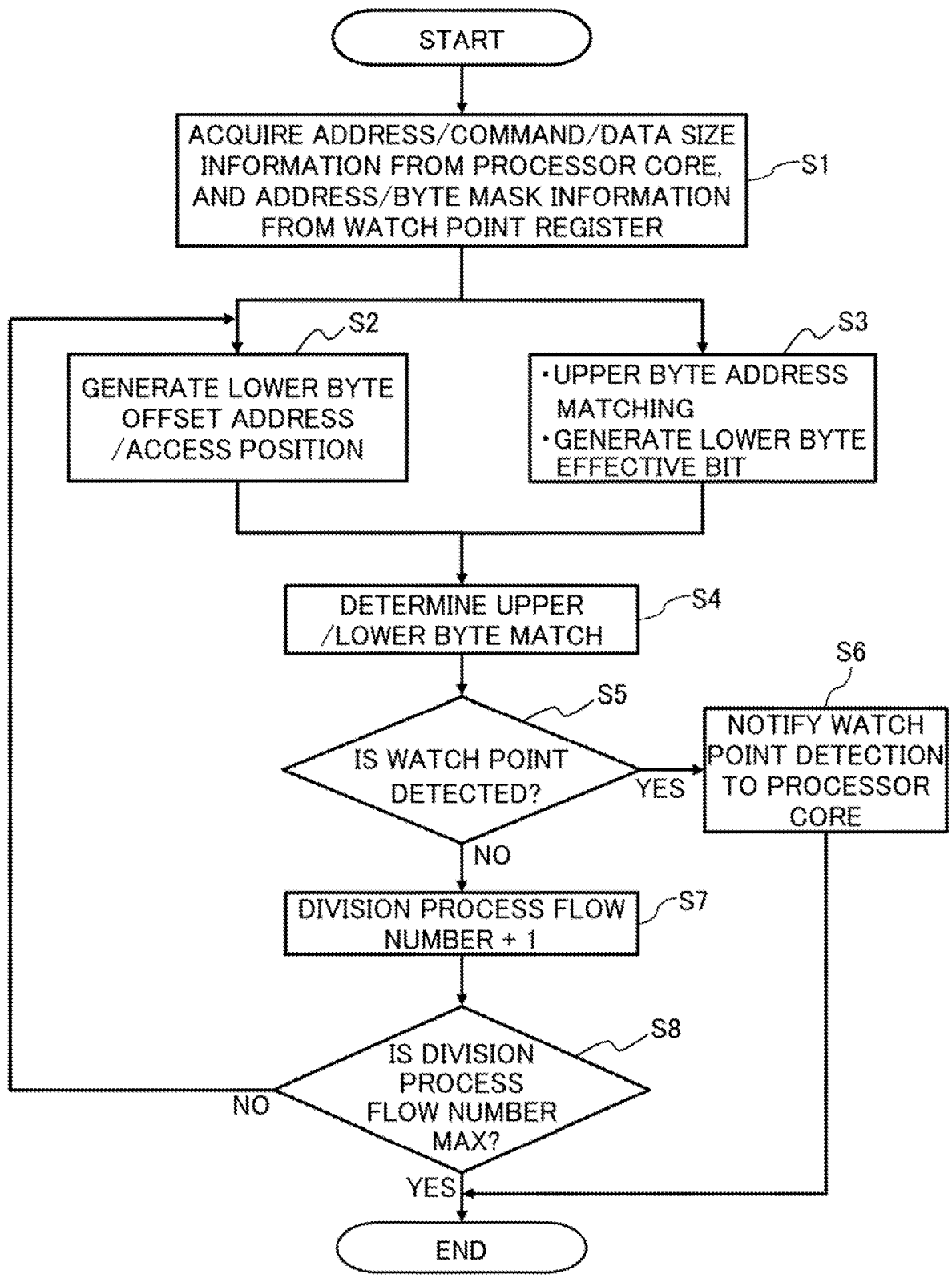
FIG. 13 is a flowchart for describing a process of the debug circuit of the processor as an example of the embodiment.

The process of the debug circuit 10 of the processor 1 as an example of the embodiment configured as described above will be described according to a flowchart (Steps S1 to S8) illustrated in FIG. 13.

In Step S1, the debug circuit 10 acquires an address, a command, and a data size from the processor core 101. In addition, the debug circuit 10 reads and acquires the watch point address and the byte mask from the watch point register 103.

In Step S2, the lower byte offset address generation circuit 104 generates the head address of the watch point retrieval target (lower byte offset address) on the basis of the lower byte of the access destination address. In other words, the lower byte offset address generation circuit 104 sets a plurality of division process flows (verification address range) ordered with the division process flow number.

The lower byte access position generation circuit 105 generates the byte access position information for each division process on the basis of the lower byte offset address, the watch point address, and the byte mask information.

On the other hand, in Step S3, the upper byte address match circuit 102 compares the upper byte in the access destination address notified from the processor core 101 and the upper byte of the watch point address notified from the watch point register 103. In a case where the address of the upper byte matches the upper byte of the watch point address as a result of the comparison, the upper byte address match circuit 102 outputs the upper byte address match signal.

In addition, the lower byte valid bit generation circuit 106 generates lower byte valid bit position information with reference to the lower byte offset address on the basis of the command and the data size information output from the processor core 101.

The processes of Steps S4 to S8 below are sequentially performed on each of the plurality of division process flows (verification target address range) along the division process flow number.

In Step S4, the lower byte match determination circuit 107 compares the lower byte access position information for each division process generated by the lower byte access position generation circuit 105 with the lower byte valid bit position information generated by the lower byte valid bit generation circuit 106. If there is a position where the lower byte access position information and the lower byte valid bit position information are commonly set to "1", the lower byte match determination circuit 107 outputs the determination result "1" to the AND gate 108.

In a case where the detection permission bit read out of the watch point register 103, the determination result from the upper byte address match circuit 102, and the determination result from the lower byte match determination circuit 107 all are "1", the AND gate 108 outputs "1". If "1" is output from the AND gate 108, the determination circuit 109 determines that the watch point is detected.

In Step S5, it is checked whether the detection of the watch point is performed. In a case where the watch point is detected as a result of checking (see YES route of Step S5), the process proceeds to Step S6.

In Step S6, the determination circuit 109 performs the detection notification of the watch point on the processor core 101. The processor core 101 received the detection notification of the watch point performs a process such as stopping a program in progress for example. Thereafter, the debug circuit 10 ends the process.

On the other hand, in a case where the watch point is not detected as a result of checking in Step S5 (see NO route of Step S5), the process proceeds to Step S7.

In Step S7, the determination circuit 109 issues the increment command to the increment circuit 110. When receiving the increment command, the increment circuit 110 increases the division process flow number (+1), and notifies the increased division process flow number to the lower byte offset address generation circuit 104.

In Step S8, the lower byte offset address generation circuit 104 checks whether the division process flow number is a maximum value. For example, whether the division process flow number is a maximum value may be determined on the basis of the data size information notified from the processor core 101.

In a case where the division process flow number is not a maximum value as a result of checking (see NO route of Step S8), the process returns to Step S2. The lower byte offset address specified by the division process flow number increased in Step S7 is processed.

In other words, in the processor 1, the plurality of lower byte offset addresses are generated on the basis of the access destination address from the processor core 101, and it is sequentially verified whether the plurality of offset addresses are matched to the watch point address.

On the other hand, in a case where the division process flow number is a maximum value (see YES route of Step 68), the process ends.

(C) Effects

In this way, according to the processor 1 as an example of the embodiment, the lower byte offset address generation circuit 104 generates (calculates) the plurality of lower byte offset addresses. With this configuration, the access destination region (data bus width) of the processor core 101 can be virtually partitioned into the plurality of verification address ranges for each set processing unit size.

Then, the lower byte access position information is generated by the lower byte access position generation circuit 105 for each generated lower byte offset address (division process flow), and the match determination with respect to the watch point address and the byte mask is performed by the lower byte match determination circuit 107 and the AND gate 108. In other words, the match determination with respect to the watch point address is sequentially performed on the plurality of verification address ranges by the lower byte valid bit generation circuit 106, the lower byte match determination circuit 107, and the AND gate 108. In a case where the match is not determined in the determination on one division process flow, the process proceeds to the next division process flow by the increment circuit 110, and the same match determination is repeatedly performed.

With this configuration, a generation circuit of the lower byte offset address and a comparison circuit (comparator) with respect to the watch point address and the byte mask can be commonly configured in a division unit of the data size without redundantly providing the lower byte valid bit generation circuit 106, the lower byte match determination circuit 107, and the AND gate 108. Therefore, the circuits and the lines are not increased even if the type of commands and the data size width are increased, so that the manufacturing cost can be reduced, and the power consumption can be reduced.

Since the lower byte valid bit generation circuit 106 generates the lower byte valid bit position information with reference to the lower byte offset address, a position valid as the access destination in the lower byte offset address is specified.

Further, the lower byte access position generation circuit 105 generates the byte access position information for each division process on the basis of the lower byte offset address, the watch point address, and the byte mask information. With this configuration, detection determination positions corresponding to the watch point address and the byte mask are specified with respect to the lower byte offset address. The lower byte match determination circuit 107 determines whether there is a position where the lower byte access position information and the lower byte valid bit position information are commonly set to "1", so that it is possible to efficiently perform the match determination with respect to the watch point address and the byte mask in the lower byte address.

The lower byte offset address generation circuit 104 generates the plurality of lower byte offset addresses on the basis of the access destination address from the processor core 101. Then, the lower byte match determination circuit 107 sequentially performs the match verification on the plurality of offset addresses with respect to the watch point address. With this configuration, it is possible to realize the match verification of the plurality of offset addresses with respect to the watch point address using the lower byte match determination circuit 107 and the AND gate 108 which are commonly configured.

(D) Other Configurations

The disclosed technology is not limited to the above embodiment, and various modifications may be made within a scope not departing from the spirit of the embodiment. The configurations and processes of the embodiment may be optionally selected as needed, or may be appropriately combined.

For example, in the above embodiment, the masking using the detection permission bit read out of the watch point register 103 is performed after the lower byte match determination of the lower byte match determination circuit 107, but the invention is not limited thereto.

Figure 14:
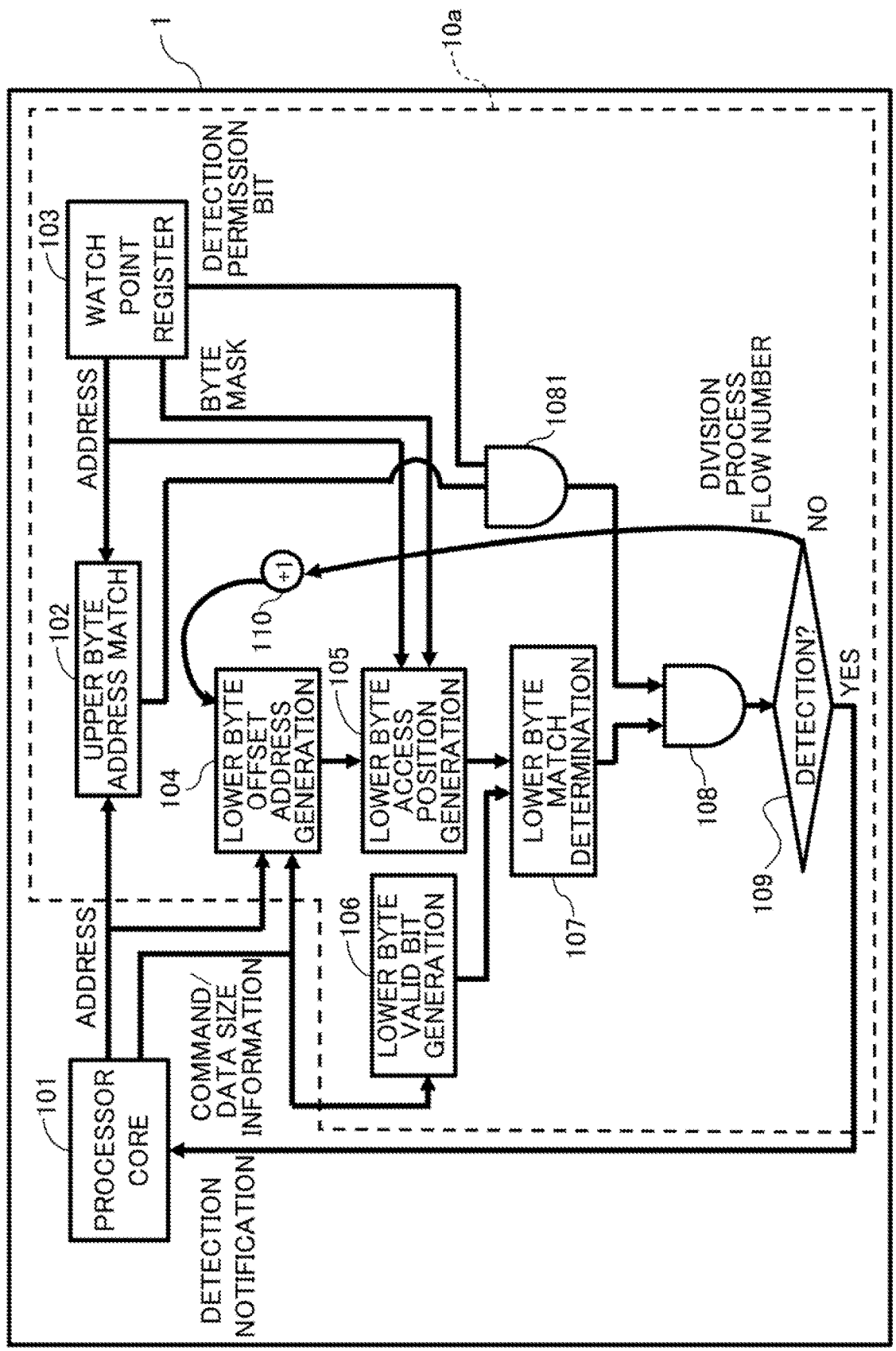
FIG. 14 is a diagram illustrating a modification of the debug circuit of the processor illustrated in FIG. 1.
Figure 15:
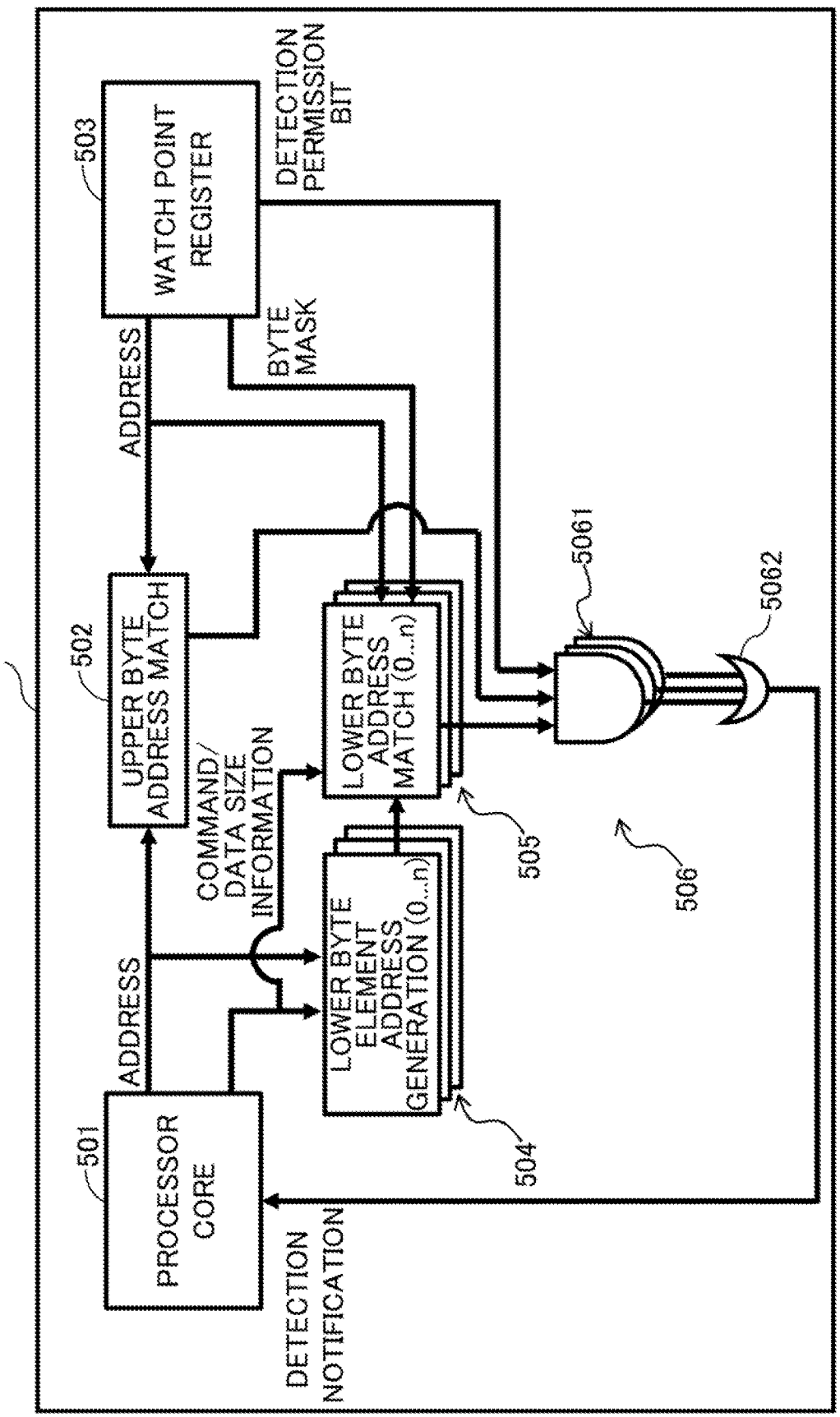
FIG. 15 is a diagram for describing the debug function of a processor of the related art.

FIG. 14 is a diagram illustrating a modification of the debug circuit 10 of the processor 1 illustrated in FIG. 1.

In the example illustrated in FIG. 14, the debug circuit 10*a* is provided with an AND gate 1081 in the debug circuit 10 of FIG. 1. Then, the upper byte address match signal output from the upper byte address match circuit 102 and the detection permission bit read out of the watch point register are input to the AND gate 1081.

In a case where the upper byte address match signal and the detection permission bit both are "1", the AND gate 1081 outputs "1" to the AND gate 108.

The AND gate 108 receives an output signal from the lower byte match determination circuit 107, and an output from the AND gate 1081.

In this modification, in a case where the address of the upper byte matches the upper byte of the watch point address as a result of the upper byte address match determination of the upper byte address match circuit 102, the byte access position information is created using the byte mask by the lower byte offset address generation circuit 104.

On the other hand, in a case where the address of the upper byte does not match the upper byte of the watch point address as a result of the upper byte address match determination, a process of detecting the watch point ends without performing the subsequent division process flow.

With this configuration, in a case where the address of the upper byte does not match the upper byte of the watch point address as a result of the upper byte address match determination, the unnecessary subsequent division process flow is not performed, so that the debugging can be efficiently processed.

In addition, a person skilled in the art can perform and manufacture the embodiment through the above disclosure.

According to an embodiment, it is possible to simplify the configuration of a debug function in the processor.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A calculation processing apparatus, comprising:
a calculating circuit; and
a monitoring circuit which monitors data access from the calculating circuit to a monitoring target address,
wherein the monitoring circuit includes
an offset address generator configured to generate a plurality of offset addresses at a pitch of a basic processing unit size on the basis of an access destination address from the calculating circuit, and configured to set a plurality of verification address ranges by partitioning an access destination memory region to be accessed from the calculating circuit at the plurality of offset addresses; and
a determiner configured to determine sequentially whether the plurality of set verification address ranges are matched with the monitoring target address.

2. The calculation processing apparatus according to claim 1, further comprising:
a memory which stores the monitoring target address and a byte mask to extract a verification target bit position in a bit string of a verification address included in one of the plurality of set verification address range ranges;

a byte valid bit generator which generates byte valid bit position information indicating a valid bit position of the data access at the access destination address from the calculating circuit; and a byte access position generator which generates byte access position information indicating an access verification position at the verification address on the basis of the offset address, the monitoring target address, and the byte mask, wherein the determiner determines whether the byte valid bit position information matches the byte access position information.

3. The calculation processing apparatus according to claim 2, further comprising:

a notificator which issues a detection notification to the calculating circuit in a case where the determiner determines that the byte valid bit position information matches the byte access position information.

4. The calculation processing apparatus according to claim 2, wherein, in a case where the determiner determines that the byte valid bit position information does not match the byte access position information, the byte access position generator and the determiner perform a process on an unprocessed verification address range among the plurality of verification address ranges.

5. A method for controlling a calculation processing apparatus which includes a calculating circuit, and a monitoring circuit which monitors data access from the calculating circuit to a monitoring target address, the method comprising:

generating, by the monitoring circuit, a plurality of offset addresses at a pitch of a basic processing unit size on the basis of an access destination address from the calculating circuit;

setting, by the monitoring circuit, a plurality of verification address ranges by partitioning an access destination memory region to be accessed from the calculating circuit at the plurality of offset addresses; and determining, by the monitoring circuit, sequentially whether the plurality of set verification address ranges are matched with the monitoring target address.

6. The method for controlling the calculation processing apparatus according to claim 5, further comprising:

generating byte valid bit position information indicating a valid bit position of the data access at the access destination address from the calculating circuit;

generating byte access position information indicating an access verification position at a verification address on the basis of a byte mask for extracting a verification target bit position in a bit string which includes the offset address, the monitoring target address, and the verification address included in one of the plurality of set verification address range ranges; and determining whether the byte valid bit position information matches the byte access position information.

7. The method for controlling the calculation processing apparatus according to claim 6, further comprising:

issuing a detection notification to the calculating circuit in a case where it is determined that the byte valid bit position information matches the byte access position information.

8. The method for controlling the calculation processing apparatus according to claim 6, wherein, in a case where the byte valid bit position information does not match the byte access position information, a process is performed on an unprocessed verification address range among the plurality of verification address ranges.

* * * * *